United States Patent
Ladd et al.

(10) Patent No.: US 11,201,884 B2
(45) Date of Patent: Dec. 14, 2021

(54) BUS MONITORING SYSTEM FOR DETECTING ANOMALIES INDICATIVE OF MALFUNCTIONS OR CYBER-ATTACKS

(71) Applicant: Raytheon Company, Waltham, MA (US)

(72) Inventors: Gregory A. Ladd, Frisco, TX (US); L. John Durkop, III, Cedar Park, TX (US); Cody Ray Herndon, Austin, TX (US)

(73) Assignee: Raytheon Company, Waltham, MA (US)

( * ) Notice: Subject to any disclaimer, the term of this patent is extended or adjusted under 35 U.S.C. 154(b) by 122 days.

(21) Appl. No.: 16/694,778

(22) Filed: Nov. 25, 2019

(65) Prior Publication Data

US 2021/0120024 A1  Apr. 22, 2021

Related U.S. Application Data

(60) Provisional application No. 62/773,409, filed on Nov. 30, 2018.

(51) Int. Cl.
  *H04L 29/06* (2006.01)
  *H04L 12/40* (2006.01)
  *H04L 12/24* (2006.01)

(52) U.S. Cl.
  CPC .......... *H04L 63/1425* (2013.01); *H04L 12/40* (2013.01); *H04L 41/14* (2013.01); *H04L 2012/40215* (2013.01)

(58) Field of Classification Search
  CPC ..... H04L 63/1425; H04L 12/40; H04L 41/14; H04L 2012/40215
  See application file for complete search history.

(56) References Cited

U.S. PATENT DOCUMENTS

| | | | | |
|---|---|---|---|---|
| 10,235,523 B1* | 3/2019 | Keller, III | ........... | G06F 13/4282 |
| 10,484,411 B1* | 11/2019 | Ni | ........... | H04L 12/40 |
| 2016/0188876 A1* | 6/2016 | Harris | ........... | G06F 21/554 |
| | | | | 726/23 |
| 2018/0367553 A1* | 12/2018 | Hayden | ........... | G06F 21/552 |
| 2020/0162361 A1* | 5/2020 | Rambo | ........... | G06F 11/3027 |

OTHER PUBLICATIONS

Thompson et al., "Disruptor: High performance alternative to bounded queues for exchanging data between concurrent threads", May 2011, 11 pages.

United States Department of Defense Military Standard MIL-STD-1553B, "Aircraft Internal Time Division Command/Response Multiplex Data Bus", Sep. 1978, 44 pages.

Nguyen, "Towards MIL-STD-1553B Covert Channel Analysis", Naval Postgraduate School, Jan. 2015, 35 pages.

* cited by examiner

*Primary Examiner* — Duc C Ho (57) ABSTRACT

An apparatus includes multiple interfaces configured to be coupled to multiple communication buses, where the interfaces are configured to receive bus traffic transmitted over the communication buses. The apparatus also includes one or more processing devices configured to implement an intrusion detection system. The intrusion detection system is configured to analyze the bus traffic received via one or more of the interfaces to identify anomalous bus traffic. The one or more processing devices are configured to execute multiple processes to concurrently analyze the bus traffic, and the multiple processes are configured to perform different analyses of the bus traffic.

20 Claims, 6 Drawing Sheets

BUS MONITORING SYSTEM FOR DETECTING ANOMALIES INDICATIVE OF MALFUNCTIONS OR CYBER-ATTACKS

CROSS-REFERENCE TO RELATED APPLICATION AND PRIORITY CLAIM

This application claims priority under 35 U.S.C. § 119(e) to U.S. Provisional Patent Application No. 62/773,409 filed on Nov. 30, 2018, which is hereby incorporated by reference in its entirety.

TECHNICAL FIELD

This disclosure relates generally to computer and network monitoring systems. More specifically, this disclosure relates to a bus monitoring system for detecting anomalies indicative of malfunctions or cyber-attacks.

BACKGROUND

Various types of aircraft, such as airplanes, cargo planes, helicopters, and tilt-rotor aircraft, use communication buses to facilitate communications between various subsystems and other components within the aircraft. For example, aircraft can use communication buses to transport data between cockpit displays, flight and embedded control systems, navigation systems, communication systems, and (in the case of military aircraft) targeting systems and weapons systems. The same or similar types of communication buses can also be used in satellites, radars, weapons management systems, and other systems.

SUMMARY

This disclosure provides a bus monitoring system for detecting anomalies indicative of malfunctions or cyber-attacks.

In a first embodiment, an apparatus includes multiple interfaces configured to be coupled to multiple communication buses, where the interfaces are configured to receive bus traffic transmitted over the communication buses. The apparatus also includes one or more processing devices configured to implement an intrusion detection system. The intrusion detection system is configured to analyze the bus traffic received via one or more of the interfaces to identify anomalous bus traffic. The one or more processing devices are configured to execute multiple processes to concurrently analyze the bus traffic, and the multiple processes are configured to perform different analyses of the bus traffic.

In a second embodiment, a method includes operating a bus monitoring system having multiple interfaces configured to be coupled to multiple communication buses, where the interfaces are configured to receive bus traffic transmitted over the communication buses. The method also includes, using an intrusion detection system of the bus monitoring system, analyzing the bus traffic received via one or more of the interfaces to identify anomalous bus traffic. Analyzing the bus traffic includes using one or more processing devices that execute multiple processes to concurrently analyze the bus traffic, where the multiple processes are configured to perform different analyses of the bus traffic.

In a third embodiment, a non-transitory computer readable medium stores instructions that implement an intrusion detection system. The instructions when executed cause at least one processor to receive, via at least one of multiple interfaces configured to be coupled to multiple communication buses, bus traffic transmitted over at least one of the communication buses. The instructions when executed also cause the at least one processor to analyze the bus traffic received via one or more of the interfaces to identify anomalous bus traffic. The instructions that cause the at least one processor to analyze the bus traffic include instructions that cause the at least one processor to execute multiple processes to concurrently analyze the bus traffic, where the multiple processes are configured to perform different analyses of the bus traffic.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 6, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

As noted above, aircraft, satellites, radars, weapons management systems, and other systems typically include communication buses to facilitate communications between their various subsystems and other components. In an aircraft, for example, communication buses can be used to transport data between cockpit displays, flight and embedded control systems, navigation systems, communication systems, and targeting and weapons systems in military aircraft. Example types of communication buses include MIL-STD-1553B ("1553B") buses, MIL-STD-1760E ("1760E") buses, ARINC 429 buses, and Controller Area Network (CAN) buses. Unfortunately, these types of communication buses have been developed without regard for cyber-resiliency. These types of communication buses are therefore susceptible to faults, malware, or other exploits being injected into the communication buses, such as by compromised terminals or other compromised components. As a result, any compromised component can often inject exploits onto an entire communication bus and can often affect or infect any other components that are coupled to the communication bus.

This disclosure describes various techniques for bus monitoring, which can be used to detect anomalies that are indicative of malfunctions or cyber-attacks. As described in more detail below, a bus monitoring system is used to aid in the detection of anomalies on 1553B buses, 1760E buses, ARINC 429 buses, CAN buses, and/or other avionics or other communication bus topologies. The bus monitoring system includes a data processing and analysis module that receives bus traffic over one or more communication buses and processes the bus traffic to identify anomalous transmissions or other bus behaviors that might be indicative of malfunctions or cyber-attacks. The 1553B protocol, for instance, has a well-defined set of behaviors that occur during normal operation, and the data processing and analysis module can analyze the bus traffic on a 1553B bus to identify situations that vary from those well-defined behaviors.

The data processing and analysis module can process bus traffic concurrently or in any other suitable manner to support real-time analysis of the bus traffic. The data processing and analysis module can also support a wide variety of data processing algorithms to identify anomalous transmissions or other bus behaviors, such as analog analysis of waveforms and/or digital analysis of bus traffic. Further, special-purpose analysis techniques for specific avionics device types or other device types may be used in the data processing and analysis module, such as to provide inspection of bus traffic specific to certain types of avionics devices or other devices. Example types of avionics devices may include specific types of navigation systems (such as Global Positioning System or other satellite-based or other navigation systems), specific types of platform or weapons control systems, and specific types of external or internal communication systems.

The bus monitoring system also includes a physical access module that can host multiple physical communication adapters. The communication adapters can provide physical and logical interactions with different communication buses. The different communication buses may represent the same type of bus or different types or configurations of buses. For instance, communication adapters can provide physical and logical interactions with identical or different configurations of the same type of bus (like different configurations of 1553B buses and/or other types of buses) and/or with different types of buses (such as different 1553B, 1760E, ARINC 429, and/or CAN buses). In some embodiments, the bus monitoring system operates in a passive bus monitor mode to monitor bus traffic over the communication buses. In other embodiments, the bus monitoring system also has the ability to inject non-standard traffic onto the communication buses, which can be done to support anomaly creation, inject vulnerabilities in support of simulating cyber-attacks, or support other functions.

In this way, a bus monitoring system can provide strict monitoring of 1553B bus transactions or other bus transactions. This can be done to detect malfunctions of the communication bus itself or malfunctions of components coupled to the bus. This can also or alternatively be done to detect possible cyber-attacks, such as the injection of faults, malware, or other exploits onto the communication bus or the presence of faults, malware, or other exploits in components coupled to the communication bus. These functions can be performed in real-time, and the results can be used to notify one or more users (such as a pilot or other personnel on board an aircraft) of any detected non-compliant bus behavior in real-time. This functionality can be used in a number of applications, such as in military and safety-critical systems of aircraft, radars, satellites, and weapons management systems.

Moreover, there are various features of the bus monitoring system that enable its use in a variety of applications. For example, the use of multiple physical interfaces helps to support the use of the bus monitoring system with multiple bus types and configurations, and the modular design of the bus monitoring system supports the interchangeability of hardware interfaces. Hardware abstraction allows the switching out of different interfaces in the bus monitoring system with little if any impact to the other components of the bus monitoring system. Example types of physical interfaces that may be supported include Peripheral Component Interconnect (PCI), PCI-x, Virtual Management Ethernet (VME), and Universal Serial Bus (USB) interfaces, and example types of bus interfaces that may be supported include 1553B standard twinax cable and Ethernet interfaces.

The configurability of the data processing and analysis module helps to support multiple analysis approaches, and a configurable number of processes for analyzing bus traffic concurrently can be provided in the bus monitoring system without sacrificing performance. The actual number of processes used in the bus monitoring system can be tunable, such as to balance the desired analysis needs against any size, weight, and power (SWaP) considerations of a host aircraft, vehicle, or other larger system. In addition, the use of certain features, such as standard Portable Operating System Interface (POSIX) interfaces, helps to make the bus monitoring system portable to multiple processor types. Example processor types may include commercial Real Time Operating System (RTOS) processors and free and open-source embedded Linux operating system processors. The use of a standard interface like a POSIX interface may also allow the functionality of the bus monitoring system to be incorporated into existing systems without the need for additional hardware components. Thus, the bus monitoring system may be deployed in various ways, such as when a bus monitoring system is used to monitor one or multiple communication buses, when a bus monitoring system utilizes a direct connection to a communication bus, or when a bus monitoring system is used to support analysis of bus traffic delivered over Ethernet. Additional details of the bus monitoring system are provided below.

Figure 1:
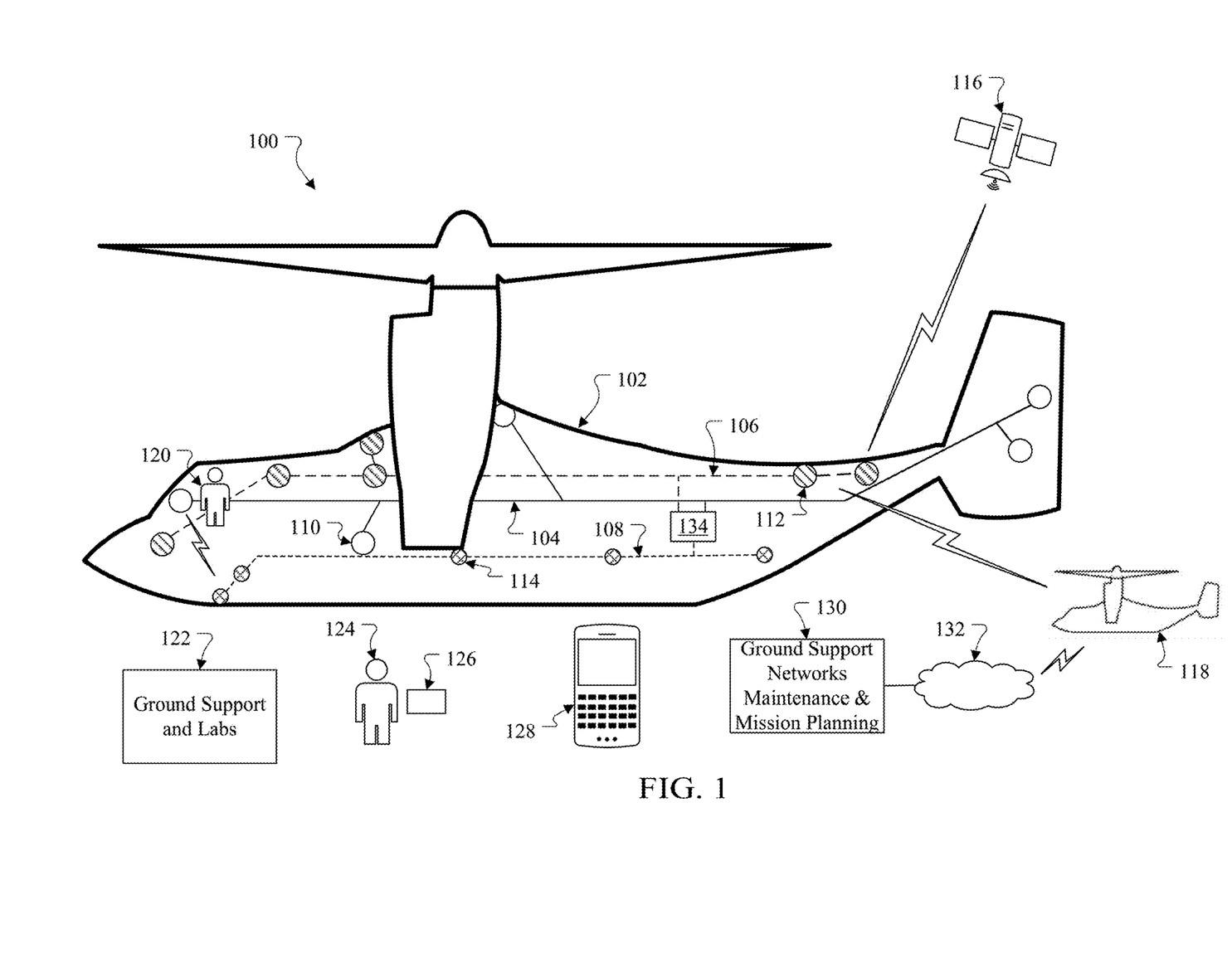
FIG. 1 illustrates an example system supporting bus monitoring for detecting anomalies indicative of malfunctions or cyber-attacks in accordance with this disclosure.

FIG. 1 illustrates an example system 100 supporting bus monitoring for detecting anomalies indicative of malfunctions or cyber-attacks in accordance with this disclosure. As shown in FIG. 1, the system 100 includes an aircraft 102. In this particular example, the aircraft 102 represents a tilt-rotor aircraft, although the bus monitoring functionality may be used with other types of aircraft, such as fixed-wing aircraft or helicopters. Also, as noted above, the use of the bus monitoring functionality described in this patent document is not limited to use with just aircraft.

The aircraft 102 includes one or more avionics communication buses, which are used to transport information and signaling between various subsystems and other components of the aircraft 102. In this example, the aircraft 102 includes three communication buses 104, 106, 108, which may be used to transport information and signaling used for different purposes or functions on the aircraft 102. For example, the bus 104 may transport information and signaling between components 110 related to aircraft control. Aircraft control components 110 may include one or more cockpit displays, one or more flight and embedded control systems, one or more flight safety-related systems, and/or one or more navigation systems, such as a Global Positioning System (GPS) receiver or other satellite-based or other navigation receiver. The bus 106 may transport information and signaling between components 112 related to sensing and communications. Sensing and communications components 112 may include one or more systems used for satellite communications involving at least one satellite 116, line-of-sight (LOS) communications involving at least one other aircraft 118, various sensors on the aircraft 102, and/or equipment in at least one electro-optical/infrared (EO/IR) pod or other structure coupled to the aircraft 102. The bus 108 may transport information and signaling between components 114 related to at least one weapons system. Weapons system components 114 may include one or more targeting systems used to identify and lock onto targets, one or more stores management systems used to integrate fire control with aircraft sensors and mission management systems, and/or one or more "smart" weapons.

Note that an aircraft 102 may include any suitable number of communication buses, including a single communication bus. Also, each communication bus may be coupled to any suitable number(s) and type(s) of components and may be used to transport any suitable information and signaling between those components. Thus, the use of three communication buses 104, 106, 108 in FIG. 1 and the specific types of components 110, 112, 114 coupled to those buses are examples only. Further note that if multiple communication buses are used in an aircraft 102, the communication buses may or may not be isolated from one another. In the example in FIG. 1, the bus 106 may be isolated from the other buses 104 and 108, and the buses 104 and 108 may interact with one another. This may allow, for instance, a pilot 120 or other personnel to control the operation of or otherwise interact with one or more targeting systems, stores management systems, smart weapons, and/or other components 114 on the bus 108 via a component 110 on the bus 104. However, this is for illustration only, and any suitable arrangement of communication buses (whether or not isolated) may be used on the aircraft 102.

There are various ways in which faults, malware, or other exploits can enter one or more of the communication buses 104, 106, 108 and/or one or more of the components 110, 112, 114 of the aircraft 102. For example, personnel who work on the aircraft 102 may introduce exploits into one or more communication buses 104, 106, 108 or one or more components 110, 112, 114, such as via an infected personal device (like an infected Flash drive). One or more infected components 110, 112, 114 may be installed on or to the aircraft 102, and exploits may be injected onto one or more communication buses 104, 106, 108 or onto one or more other components 110, 112, 114. This may occur if a supply chain for any of the components 110, 112, 114 has been compromised.

Ground support equipment 122 generally represents equipment used to service aircraft 102 between flights and to evaluate one or more aspects of the aircraft 102. Exploits may be injected into one or more communication buses 104, 106, 108 or one or more components 110, 112, 114 when the ground support equipment 122 is used with the aircraft 102. Service personnel 124 using service instruments 126 may perform maintenance on the aircraft 102. Exploits may be injected into one or more communication buses 104, 106, 108 or one or more components 110, 112, 114 through the service instruments 126 or other devices used by the service personnel 124. Handheld devices 128 may be used to load data into or record data from the aircraft 102. Exploits may be injected into one or more communication buses 104, 106, 108 or one or more components 110, 112, 114 through the handheld devices 128.

Ground support networks, maintenance, and mission planning systems 130 may be used to schedule or otherwise assist with ground support operations, maintenance operations, or mission planning operations. Exploits may be injected into one or more communication buses 104, 106, 108 or one or more components 110, 112, 114 through the systems 130. The systems 130 may also communicate (possibly via one or more networks 132) with other aircraft 118. Exploits may be injected laterally from the other aircraft 118 into one or more communication buses 104, 106, 108 or one or more components 110, 112, 114 of the aircraft 102. In addition, the aircraft 102 can communicate with one or more satellites 116, such as for navigation purposes or communication purposes. Exploits may be injected into one or more communication buses 104, 106, 108 or one or more components 110, 112, 114 through the satellites 116.

Exploits may negatively affect various aspects of the aircraft 102. For example, exploits injected into one or more communication buses 104, 106, 108 or one or more components 110, 112, 114 may prevent certain components 110, 112, 114 from operating correctly and performing desired functions. As particular examples, exploits may infect a landing gear controller to prevent proper raising or lowering of landing gear, infect a weapons controller to prevent proper targeting or firing of weapons, or infect a navigation system to prevent proper geolocation of the aircraft 102. Also, exploits injected into one or more communication buses 104, 106, 108 or one or more components 110, 112, 114 may interfere with proper communications over the bus(es). Further, exploits injected into one or more communication buses 104, 106, 108 or one or more components 110, 112, 114 may allow for reconnaissance by an external actor (such as surreptitiously enumerating the types and configurations of components attached to a bus), attempts to "pivot" within the system 100 and exploit another component 110, 112, 114 attached to a bus 104, 106, 108, or covert communications between deployed malicious agents in the system 100.

As described in more detail below, at least one bus monitoring system 134 may be used with the aircraft 102 to detect anomalies indicative of malfunctions or cyber-attacks. A bus monitoring system 134 may be used with a single communication bus 104, 106, 108, in which case the aircraft 102 may include a bus monitoring system 134 for each bus 104, 106, 108. Also or alternatively, a bus monitoring system 134 may be used with multiple communication buses 104, 106, 108. In response to detecting anomalous behavior on at least one communication bus 104, 106, 108 that is indicative of a malfunction or a cyber-attack, the bus monitoring system 134 may alert the pilot 120 or other personnel or take other suitable corrective action.

Also as described in more detail below, the bus monitoring system 134 can be modular and may include a physical access module and a data processing and analysis module. The physical access module may include multiple interfaces that can be coupled to multiple communication buses 104, 106, 108, which allows the bus monitoring system 134 to monitor traffic being transported over multiple buses. The data processing and analysis module processes bus traffic received over one or more buses 104, 106, 108 (possibly in real-time) to identify anomalous bus behaviors. The anomalous bus behaviors may be indicative of malfunctions associated with one or more components 110, 112, 114 or any of various cyber-based exploits of one or more communication buses 104, 106, 108 or one or more components 110, 112, 114. Various analysis algorithms may be supported by the bus monitoring system 134, including special-purpose analysis techniques for specific device types. In this way, the bus monitoring system 134 can help to protect the aircraft 102 against various threats, including malfunctions and/or cyber-attacks.

Although FIG. 1 illustrates one example of a system 100 supporting bus monitoring for detecting anomalies indicative of malfunctions or cyber-attacks, various changes may be made to FIG. 1. For example, components can be added, omitted, combined, further subdivided, replicated, or placed in any other suitable configuration according to particular needs. Also, the makeup and arrangement of components on the aircraft 102 are for illustration only, and this disclosure does not limit the bus monitoring functionality to any specific environment.

Figure 2:
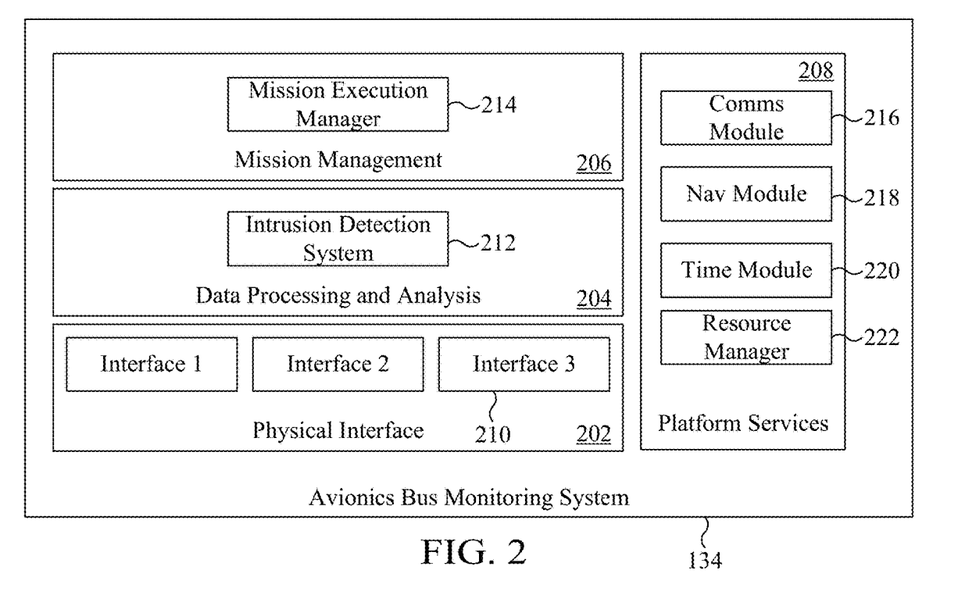
FIG. 2 illustrates an example bus monitoring system for detecting anomalies indicative of malfunctions or cyber-attacks in accordance with this disclosure.

FIG. 2 illustrates an example bus monitoring system 134 for detecting anomalies indicative of malfunctions or cyber-attacks in accordance with this disclosure. For ease of explanation, the bus monitoring system 134 shown in FIG. 2 is described as being used in the aircraft 102 of FIG. 1 to monitor traffic over at least one of the communication buses 104, 106, 108 of FIG. 1. However, the bus monitoring system 134 may be used with any other suitable communication bus(es) and in any other suitable environment.

As shown in FIG. 2, the bus monitoring system 134 is implemented using a modular design and includes a physical interface module 202, a data processing and analysis module 204, a mission management module 206, and a platform services module 208. Note that while four modules are shown here, the bus monitoring system 134 may be implemented using any other suitable numbers of modules. Also, in other embodiments, the bus monitoring system 134 need not be modular, and the components of the bus monitoring system 134 may be integrated.

The physical interface module 202 generally operates to support communications over one or more communication buses. In this example, the physical interface module 202 includes multiple interfaces 210 that enable the bus monitoring system 134 to be coupled to multiple communication buses in order to allow monitoring of the traffic transported over those communication buses. Depending on the circumstances, the physical interface module 202 may be coupled to a single communication bus through one of the interfaces 210, or the physical interface module 202 may be coupled to multiple communication buses through multiple ones of the interfaces 210. As a particular example, the multiple interfaces 210 may be used to couple the bus monitoring system 134 to at least one redundant pair of communication buses, such as a redundant pair of 1553B buses. Note that while three interfaces 210 are shown in FIG. 2, the physical interface module 202 may include any suitable number of interfaces 210 depending on the implementation.

Each interface 210 supports physical and logical interactions with a communication bus, such as a bus 104, 106, 108 of the aircraft 102. The multiple interfaces 210 may be coupled to multiple instances of the same type of communication bus or to different types or configurations of communication buses. As a particular example, different interfaces 210 may be used to receive analog waveforms and digital data over different buses, supporting multiple analysis approaches for analyzing bus traffic. Each interface 210 includes any suitable structure configured to be coupled to a communication bus and at least receive data (and possibly transmit data) over the communication bus. Example types of interfaces 210 may include 1553B, 1760E, ARINC 429, and CAN interfaces.

The data processing and analysis module 204 generally operates to analyze bus traffic and identify anomalous bus behaviors. In this example, the data processing and analysis module 204 includes an intrusion detection system (IDS) 212, which receives bus traffic sent over one or more communication buses via one or more of the interfaces 210. The intrusion detection system 212 also analyzes the bus traffic to identify anomalous transmissions or other anomalous bus behaviors, which may be indicative of malfunctions or cyber-attacks. As noted above, for example, the 1553B protocol has a well-defined set of behaviors that occur during normal operation, and the intrusion detection system 212 can analyze bus traffic on a 1553B bus to identify situations that vary from those well-defined behaviors. In some embodiments as described below, the intrusion detection system 212 may use various policies (i.e. rules), each of which can be selectively enabled or disabled and each of which can be used to analyze bus traffic and identify a specific type or types of anomalous bus behaviors.

In some embodiments, the intrusion detection system 212 supports concurrent processing of bus traffic from one or more communication buses. For instance, the intrusion detection system 212 may support different processes that apply different policies to the bus traffic received over one communication bus or over multiple communication buses. This helps to support real-time monitoring by the bus monitoring system 134. Real-time monitoring may be necessary or desirable in various applications, such as to support flight safety. Real-time monitoring also allows the intrusion detection system 212 to provide real-time anomaly reporting. Further, in some embodiments, the intrusion detection system 212 supports a scalable number of processes to implement the intrusion detection functionality and other functionality. For example, multiple analysis processes may be executed concurrently, and the multiple analysis processes may support the same analyses or different analyses for different communication buses. One or more additional processes may be used to support other functions of the intrusion detection system 212, such as a process for reporting detected anomalies to a pilot 120 or other personnel. Additional details regarding the intrusion detection system 212 are provided below.

Also, in some embodiments, the data processing and analysis module 204 includes or supports a hardware abstraction layer, which enables standard interactions to occur via the various interfaces 210 regardless of the actual communication bus or buses coupled to the interfaces 210. This can help to reduce or minimize the impacts associated with different communication buses to other components of the bus monitoring system 134. This can also help support the modular nature of the bus monitoring system 134 by allowing different physical interface modules 202 or different interfaces 210 to be used. As noted above, for instance, hardware abstraction allows the switching out of different interfaces 210, such as different types of physical interfaces (like PCI, PCI-x, VME, and USB interfaces) and different types of bus interfaces (like 1553B standard twinax cable and Ethernet interfaces).

The mission management module 206 generally controls the overall operation of the bus monitoring system 134 and the interactions between the bus monitoring system 134 and external systems. In this example, the mission management module 206 includes a mission execution manager 214, which acts as the primary interface with other external systems (such as an external mission management/command and control system that controls the bus monitoring system 134). In some embodiments, the mission management module 206 may receive configuration data for the bus monitoring system 134, such as one or more policies defining the bus behaviors considered to be anomalous. The mission management module 206 may also receive data controlling which analyses are performed by the intrusion detection system 212 and when those analyses occur. The intrusion detection system 212 may further report anomalous behaviors detected by the intrusion detection system 212 to the mission management/command and control system. In other embodiments, the mission management module 206 may control the bus monitoring system 134 autonomously. In addition, the mission management module 206 may initiate, monitor, and terminate various processes that implement the intrusion detection system 212 or other functions of the bus monitoring system 134.

The platform services module 208 generally supports various additional functions needed or used by the bus monitoring system 134. In this example, the platform services module 208 includes a communications module 216, a navigation module 218, a time module 220, and a resource manager 222. The communications module 216 enables the bus monitoring system 134 to communicate with one or more external components separate from the bus(es) coupled to the interfaces 210. The navigation module 218 enables the bus monitoring system 134 to receive navigation-related data, such as from a GPS or other navigation receiver of the aircraft 102. The time module 220 enables the bus monitoring system 134 to generate or obtain a clock signal or other timing data. The resource manager 222 manages processing, memory, or other resources used by the bus monitoring system 134. In some embodiments, services offered by the components of the platform services module 208 may be accessible using Application Programming Interface (API) calls, such as C API calls.

The various components of the bus monitoring system 134 can support one or more standard interfaces, such as one or more POSIX interfaces, to make the bus monitoring system 134 portable to multiple processor types. Example processor types may include commercial RTOS processors, free and open-source embedded Linux operating system processors, or other types of processors. This helps to increase the portability of the bus monitoring system 134 to a wide range of possible installations.

In some embodiments, each of the modules 202-208 may support the execution of separate processes, and different processes may communicate with each other and with external systems in various ways. For example, different processes may use inter-process communication (IPC) channels, such as mailboxes or queues, to communicate and exchange data. As another example, different processes may use a shared memory space to communicate and exchange data. Among other things, the IPC channels, shared memory space, or other mechanisms can be used to support queuing and processing of commands and bus traffic by the intrusion detection system 212 and the sharing of processing results from the intrusion detection system 212.

The actual number of processes used in the bus monitoring system 134 can be tunable, such as to balance the desired analysis needs against any SWaP considerations. When the intrusion detection system 212 initiates monitoring, a configurable number of specified analysis processes can be executed to properly monitor bus traffic for anomalies. The ability to support multiple processes here, including multiple analysis processes, may help to ensure continued or more reliable bus monitoring or management, even in the event of a failure of a communication or analysis process.

As noted above, the intrusion detection system 212 can use various policies to identify which bus traffic is considered anomalous, and the various policies may also control how anomalous bus behavior is reported or otherwise handled. The policies used by the intrusion detection system 212 can vary widely based on a number of factors, such as the bus or buses being monitored. Also, the policies used by the intrusion detection system 212 can vary over time, such as when certain policies are used during different aspects or uses of an aircraft 102 or other system.

In some embodiments, the intrusion detection system 212 can use policies to perform one or more of the following functions. The intrusion detection system 212 may inspect command or data messages associated with various bus transactions for specific types of anomalies related to those bus transactions. The intrusion detection system 212 may also inspect waveforms generated by different components coupled to a bus in order to detect whether one component is attempting to improperly function as a bus controller or other type of device on the bus. The intrusion detection system 212 may further inspect multiple bus transactions over time to detect specific patterns of anomalies extending over multiple bus transactions. In addition, the intrusion detection system 212 may emulate a bus controller to send a variety of commands and data transfer requests to other components coupled to a bus in order to characterize those bus components and their responses to various conditions.

As particular examples of the types of policies that can be used by the intrusion detection system 212 to inspect command or data messages, the intrusion detection system 212 may be used to identify the following anomalies. The intrusion detection system 212 may determine whether direct communications between specific bus components are allowed according to a policy and detect when improper attempts at direct communication occur. The intrusion detection system 212 may detect whether status messages from bus components contain specific flags that are not supposed to be used according to a policy. The intrusion detection system 212 may detect whether bus controller command messages contain specific mode codes that are invalid or that are not supposed to be used according to a policy, such as by detecting whether broadcasting of messages from a bus controller is permitted. The intrusion detection system 212 may determine whether a bus component should be only transmitting or only receiving data during a bus transaction and detect improper messages based on that determination. The intrusion detection system 212 may detect the use of unknown bus addresses or message sub-addresses in bus messages or improper message flow for a given bus address-message sub-address combination. The intrusion detection system 212 may detect when message lengths vary from those lengths permitted by a policy. The intrusion detection system 212 may detect when a bus component address used in a command message does not match a bus component address used in a related status message (or vice versa). The intrusion detection system 212 may detect when a message error flag is being used improperly or when message error bits are not being properly computed. The intrusion detection system 212 may determine whether certain types of operations or communications (such as busy and service request operations, self-tests or built-in tests, or dynamic bus control operations) are permitted according to a policy and detect messages inconsistent with that determination. The intrusion detection system 212 may detect unexpected changes in latitude and longitude data from a standard integrated navigation message on a bus. The intrusion detection system 212 may detect when timing requirements are not met, such as when a bus component fails to provide a response to a status request in accordance with a specific timing requirement.

Note that these are examples only and that various policies may be defined to identify a wide variety of bus behaviors as anomalous. In many cases, the specific policies being used will typically depend on the specific type(s) and configuration(s) of the communication bus(es) being monitored, the components that are coupled to the bus(es) being monitored, and how the bus(es) and the bus components are being used. The examples given above are merely illustrative of the types of policies that may be used by the intrusion detection system 212. However, the intrusion detection system 212 is not limited to use with these types of policies.

Although FIG. 2 illustrates one example of a bus monitoring system 134 for detecting anomalies indicative of malfunctions or cyber-attacks, various changes may be made to FIG. 2. For example, components can be added, omitted, combined, further subdivided, replicated, or placed in any other suitable configuration according to particular needs. Also, the makeup and arrangement of the different modules in the bus monitoring system 134 and of the bus monitoring system 134 itself are for illustration only, and this disclosure does not limit the bus monitoring functionality to this specific implementation.

Figure 3:
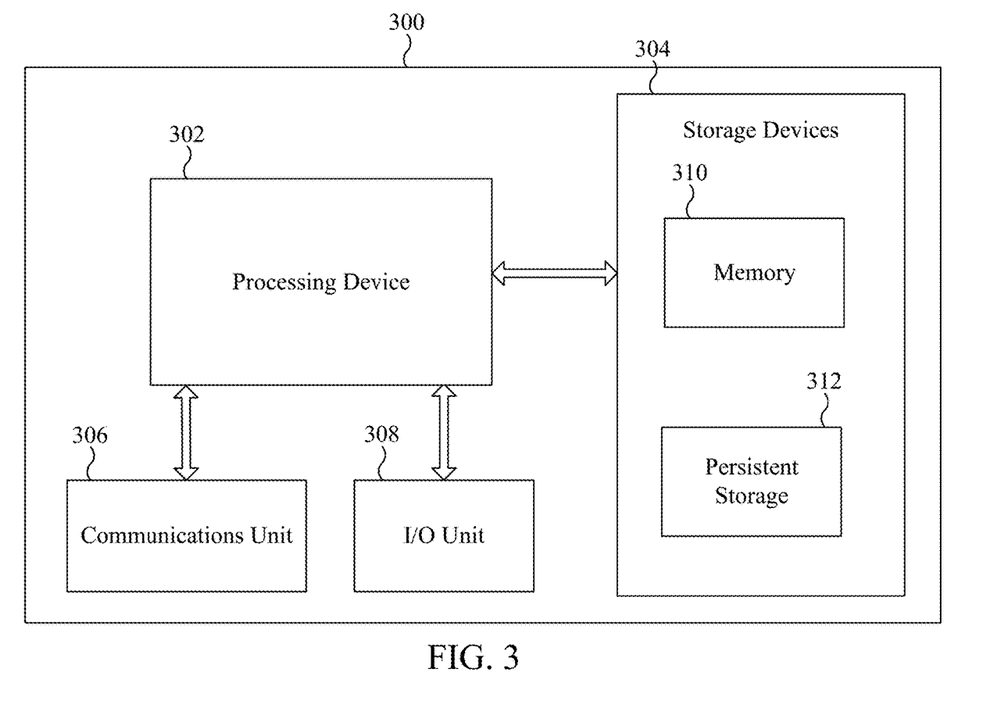
FIG. 3 illustrates an example processing system for performing intrusion detection in a bus monitoring system to detect anomalies indicative of malfunctions or cyber-attacks in accordance with this disclosure.

FIG. 3 illustrates an example processing system 300 for performing intrusion detection in a bus monitoring system to detect anomalies indicative of malfunctions or cyber-attacks in accordance with this disclosure. In particular, the processing system 300 shown in FIG. 3 may be used to execute or otherwise provide at least some of the functionality of the bus monitoring system 134. For instance, the processing system 300 may be used to execute at least the processes of the intrusion detection system 212 in order to process bus traffic and detect anomalies. For ease of explanation, the processing system 300 shown in FIG. 3 is described as being used with the bus monitoring system 134 of FIG. 2 in the aircraft 102 of FIG. 1 to monitor traffic over at least one of the communication buses 104, 106, 108. However, the processing functionality of the bus monitoring system 134 may be implemented in any other suitable manner, and the bus monitoring system 134 may be used with any other suitable communication bus(es) and in any other suitable environment.

As shown in FIG. 3, the processing system 300 denotes a computing device or system that includes at least one processing device 302, at least one storage device 304, at least one communications unit 306, and at least one input/output (I/O) unit 308. The processing device 302 may execute instructions that are loaded into a memory 310. The instructions can include instructions for processing bus traffic to identify anomalies indicative of malfunctions or cyber-attacks. The processing device 302 includes any suitable number(s) and type(s) of processors or other devices in any suitable arrangement. Example types of processing devices 302 include microprocessors, microcontrollers, digital signal processors (DSPs), application-specific integrated circuits (ASICs), field programmable gate arrays (FPGAs), and discrete circuitry.

The memory 310 and a persistent storage 312 are examples of storage devices 304, which represent any structure(s) capable of storing and facilitating retrieval of information (such as data, program code, and/or other suitable information on a temporary or permanent basis). The memory 310 may represent a random access memory or any other suitable volatile or non-volatile storage device(s). The persistent storage 312 may contain one or more components or devices supporting longer-term storage of data, such as a read only memory, hard drive, Flash memory, or optical disc.

The communications unit 306 supports communications with other systems or devices. For example, the communications unit 306 can include at least one network interface card or at least one wireless transceiver facilitating communications over one or more wired or wireless networks. The communications unit 306 may also include the one or more interfaces 210, which allows the processing system 300 to communicate over one or more communication buses like the bus(es) 104, 106, 108. The communications unit 306 may also support the communication of analysis results from the bus monitoring system 134. The communications unit 306 may support communications through any suitable physical or wireless communication link(s).

The I/O unit 308 allows for input and output of data. For example, the I/O unit 308 may provide a connection for user input through a keyboard, mouse, keypad, touchscreen, or other suitable input device. The I/O unit 308 may also send output to a display, printer, or other suitable output device. As a particular example, the I/O unit 308 may be used to receive input data (such as user selections) for the bus monitoring system 134 and to provide output data (such as alerts or other results from the intrusion detection system 212). Note, however, that there may be little or no need for local I/O if the bus monitoring system 134 is implemented or installed remotely from any users, in which case the I/O unit 308 may be omitted.

Although FIG. 3 illustrates one example of a processing system 300 for performing intrusion detection in a bus monitoring system to detect anomalies indicative of malfunctions or cyber-attacks, various changes may be made to FIG. 3. For example, any other suitable hardware implementation or hardware and software/firmware implementation may be used to implement the functionality of the bus monitoring system 134 in general or the intrusion detection system 212 in particular. Also, computing devices and systems come in a wide variety of configurations, and FIG. 3 does not limit this disclosure to any particular computing device or system.

Figure 4A:
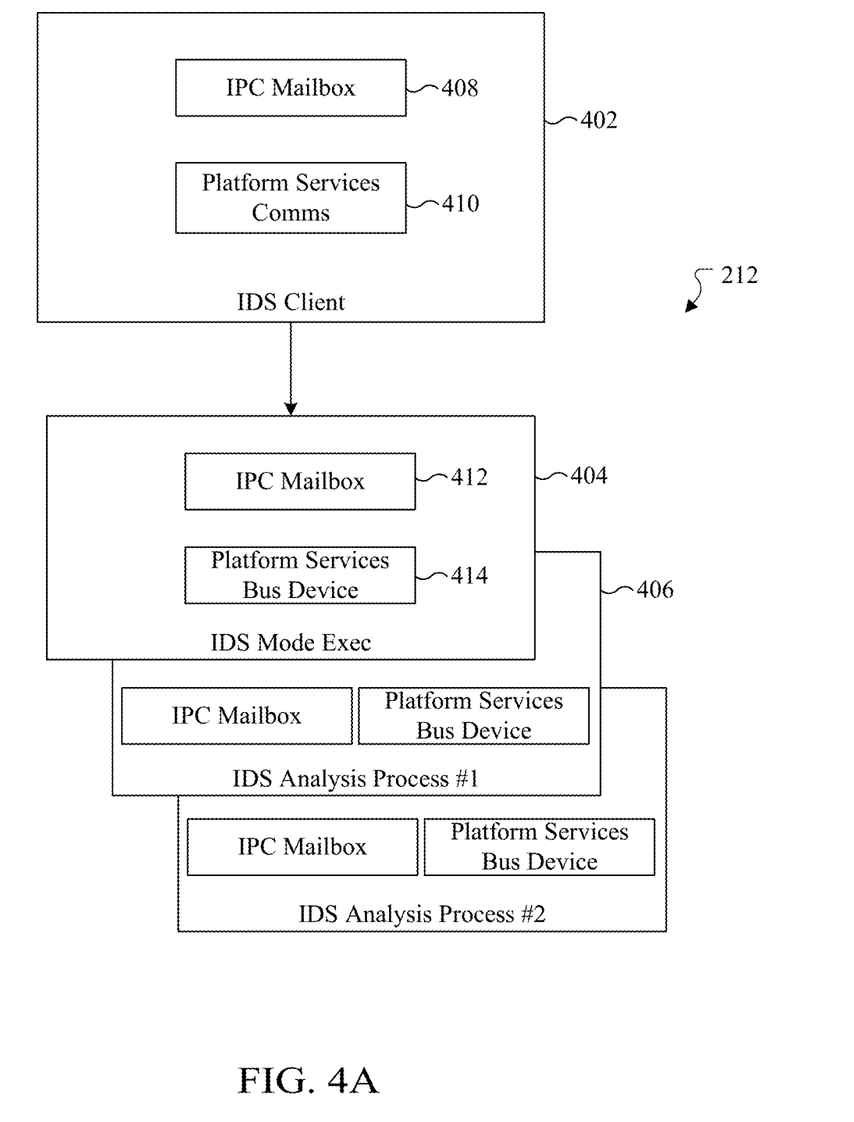
FIGS. 4A and 4B illustrate example architectures for an intrusion detection system in a bus monitoring system to detect anomalies indicative of malfunctions or cyber-attacks in accordance with this disclosure.
Figure 4B:
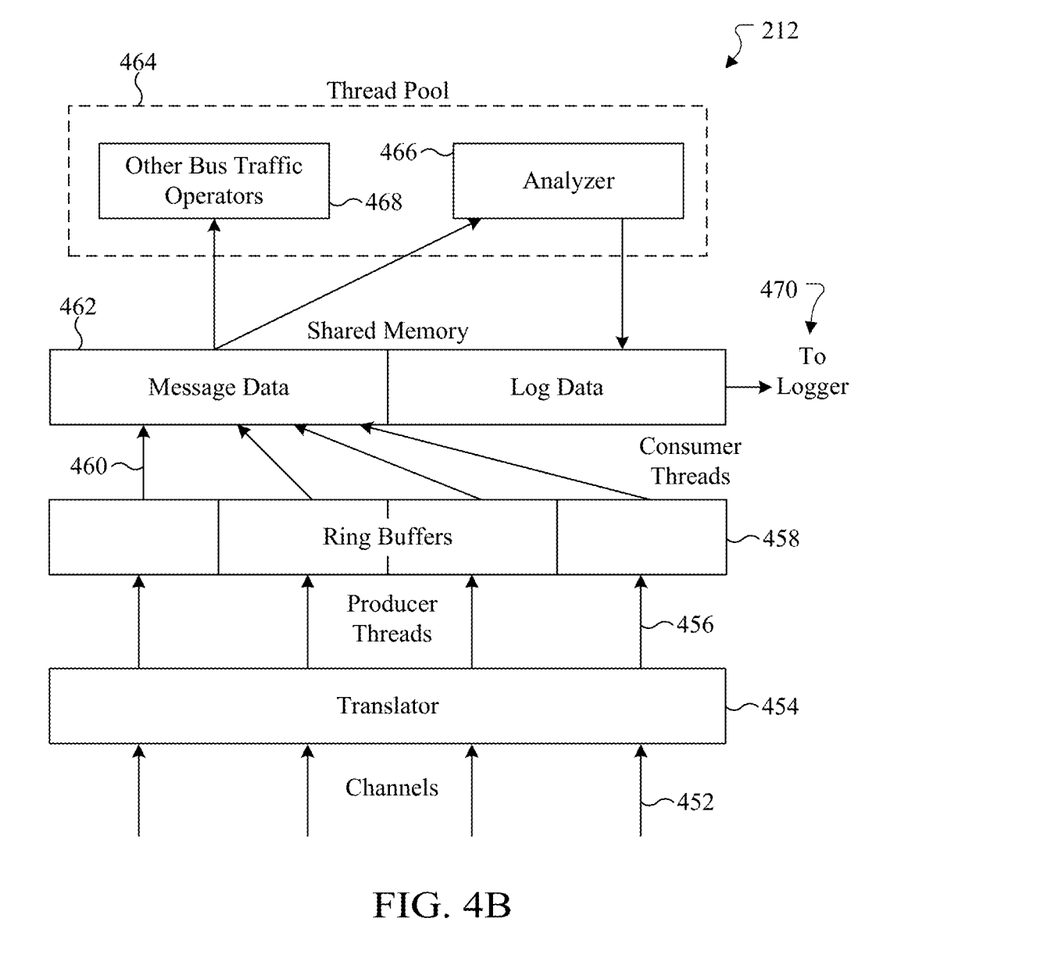

FIGS. 4A and 4B illustrate example architectures for an intrusion detection system 212 in a bus monitoring system 134 to detect anomalies indicative of malfunctions or cyber-attacks in accordance with this disclosure. For ease of explanation, the architectures of the intrusion detection system 212 shown in FIGS. 4A and 4B are described as being used with the bus monitoring system 134 of FIG. 2 in the aircraft 102 of FIG. 1 to monitor traffic over at least one of the communication buses 104, 106, 108. However, the intrusion detection system 212 may be implemented in any other suitable manner, and the intrusion detection system 212 may be used with any other suitable communication bus(es) and in any other suitable environment.

As shown in FIG. 4A, one example architecture of the intrusion detection system 212 includes an IDS client process 402, which controls the operation of other processes 404, 406 used in the intrusion detection system 212. For example, the IDS client process 402 may be used to control when other processes 404, 406 in the intrusion detection system 212 are executed and terminated. As a particular example, the IDS client process 402 may be used to initiate execution of the process 404, which (as described below) can be used to initiate execution of the processes 406. The IDS client process 402 may also receive results of analyses performed by the processes 406 (such as via the process 404) and provide the results to one or more external destinations. Note that in some cases, the IDS client process 402 may actually be executed as part of or included in the mission management module 206 or otherwise outside of the data processing and analysis module 204.

The process 404 shown in FIG. 4A represents an IDS mode exec process, and the processes 406 shown in FIG. 4A represent IDS analysis processes. The IDS analysis processes 406 generally operate to analyze bus traffic and identify anomalous bus behaviors. The number of IDS analysis processes 406 may vary based on a number of factors, such as the number of communication buses being monitored. Also, the IDS analysis processes 406 may use different policies to process bus traffic from different buses in order to perform different analyses of the bus traffic and to identify different anomalous bus behaviors. As noted above, the types of analyses performed by the IDS analysis processes 406 can vary widely. The IDS mode exec process 404 generally operates to identify which IDS analysis processes 406 are to be performed and to initiate and terminate execution of those IDS analysis processes 406.

In this example, the IDS processes 402, 404, 406 include or support different threads that perform various operations of the processes. For example, the IDS client process 402 includes an IPC mailbox thread 408 and a platform services communication thread 410. Also, each of the IDS mode exec process 404 and the IDS analysis processes 406 includes an IPC mailbox thread 412 and a platform services bus device thread 414. The IPC mailbox threads 408 and 412 support the use of mailboxes as inter-process communication channels. For instance, the IDS client process 402 and the IDS mode exec process 404 may receive data from one another via their respective IPC mailbox threads 408 and 412. Also, the IDS mode exec process 404 and each IDS analysis process 406 may receive data from one another via their respective IPC mailbox threads 412. Among other things, the IPC mailbox threads 412 support queuing and processing of commands and bus traffic by the IDS analysis processes 406. The platform services communication thread 410 enables the IDS client process 402 to communicate with the platform services module 208, such as to obtain data from the platform services module 208. Each platform services bus device thread 414 enables the associated IDS mode exec process 404 or IDS analysis process 406 to at least receive data (and possibly to transmit data) over a communication bus. The ability to execute a number of IDS analysis processes 406 in parallel supports the concurrent analysis of bus traffic (such as with different policies), where the bus traffic is received from one communication bus or multiple communication buses.

As shown in FIG. 4B, another example architecture of the intrusion detection system 212 uses a producer-consumer approach for providing data for analysis. Here, the intrusion detection system 212 receives bus traffic over multiple channels 452, which may represent communication channels established through one or more interfaces 210 of the bus monitoring system 134 to one or more communication buses. One or more translator processes 454 are used to read the bus traffic from the communication bus(es). The data that is output from the translator processes 454 is provided by multiple producer threads 456 for storage in different ring or circular buffers 458, which typically operate by storing newer data by overwriting older data. The ring buffers 458 may all reside within or form a part of a common memory space, which may allow the ring buffers 458 to be resized easily based on the number of producer threads 456. In some embodiments, the producer threads 456 can be pinned to and executed using different processors (such as 302 in FIG. 3) so that they do not compete for resources like processor time and can independently pull bus traffic off a bus unhindered (possibly at line speed).

Consumer threads 460 are used to retrieve stored bus traffic from the ring buffers 458 for storage in a shared memory 462. In some embodiments, the consumer threads 460 may be associated with different bus channels being monitored, and the bus traffic stored in the shared memory 462 may be treated as work items. A number of threads in a thread pool 464 can retrieve the work items from the shared memory 462 (or otherwise retrieve the stored bus traffic from the shared memory 462) for use. In this example, the thread pool 464 includes one or more analysis threads 466 and other bus traffic operator threads 468. The analysis threads 466 can implement the data analysis and anomaly detection functionality of the intrusion detection system 212, such as by detecting anomalies based on various policies. The other threads 468 may perform other desired operations using the bus traffic. The work items (or bus traffic) can be divided among the various threads in the thread pool 464 in any suitable manner, such as by using a work stealing algorithm.

The threads 466, 468 in the thread pool 464 can process the bus traffic and write at least some of the processing results to the shared memory 462. For instance, the analysis threads 466 can write indicators of alerts or detected anomalous bus behaviors to the shared memory 462. A logger 470 may retrieve data from the shared memory 462 and store the data or use the data in some manner. In some cases, the logger 470 represents a separate process from other processes in the intrusion detection system 212. Among other things, this may allow the logger 470 to block memory when needed so that data writes to a storage medium can be done atomically. This may help guarantee that, if power is lost, all bus traffic seen until power loss is captured.

The producer-consumer approach here allows producer threads 456 and consumer threads 460 to be added and removed as needed, possibly along with corresponding changes in the sizes of the ring buffers 458. This can occur during runtime without affecting or stopping the other producer threads 456 and consumer threads 460. As a result, this allows the intrusion detection system 212 to reallocate resources as needed, such as during mission changeovers, without slowing down or dropping bus traffic. Also, support for a new bus or protocol can be added by implementing a new translator process 454 and the appropriate thread(s) 466, 468 in the thread pool 464.

Although FIGS. 4A and 4B illustrate examples of architectures for an intrusion detection system 212 in a bus monitoring system 134 to detect anomalies indicative of malfunctions or cyber-attacks, various changes may be made to FIGS. 4A and 4B. For example, components in each architecture can be added, omitted, combined, further subdivided, replicated, or placed in any other suitable configuration according to particular needs. Also, an intrusion detection system 212 may be implemented in any other suitable manner, and this disclosure is not limited to IDS architectures that use IPC mailbox threads or producer/consumer threads.

Figure 5:
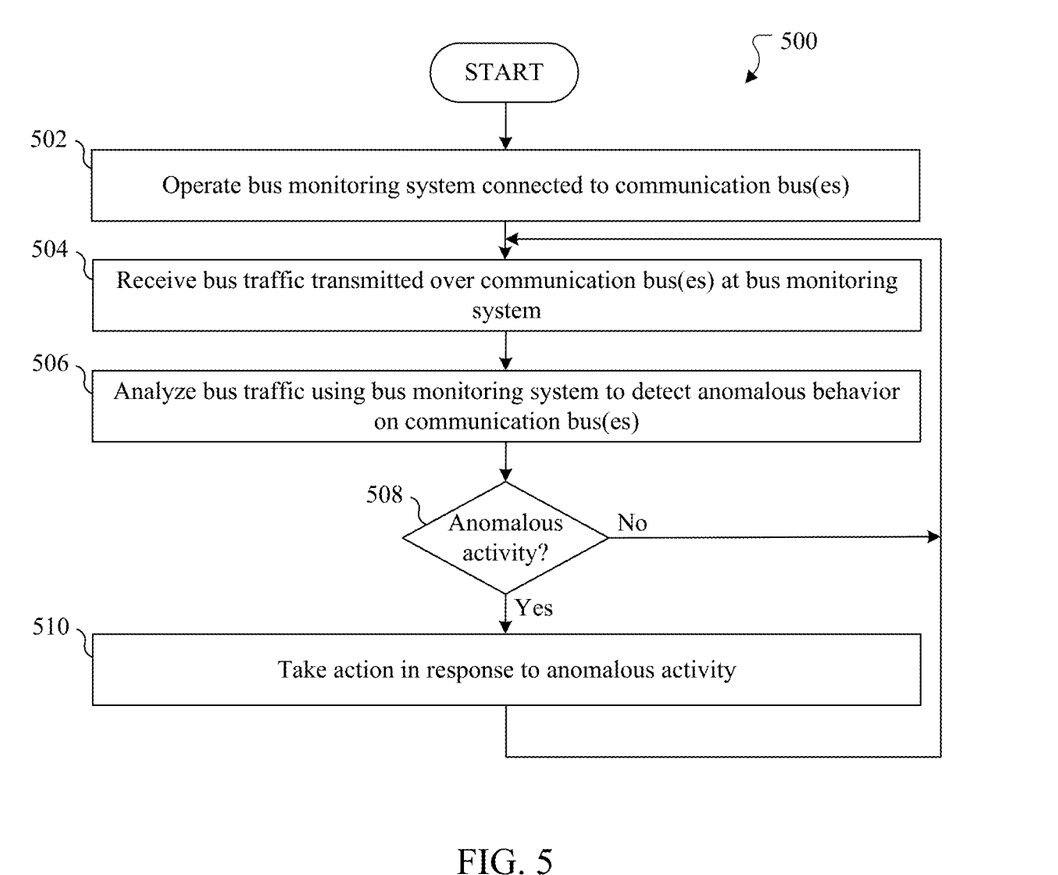
FIG. 5 illustrates an example method for bus monitoring to detect anomalies indicative of malfunctions or cyber-attacks in accordance with this disclosure.

FIG. 5 illustrates an example method 500 for bus monitoring to detect anomalies indicative of malfunctions or cyber-attacks in accordance with this disclosure. For ease of explanation, the method 500 shown in FIG. 5 is described as involving the use of the bus monitoring system 134 of FIG.

2 in the aircraft 102 of FIG. 1 to monitor traffic over at least one of the communication buses 104, 106, 108 of FIG. 1. However, the method 500 may involve the use of any other suitable bus monitoring system designed in accordance with this disclosure, which may be used to monitor any suitable communication bus(es) in any suitable environment.

As shown in FIG. 5, a bus monitoring system operates while connected to one or more communication buses at step 502. This may include, for example, the bus monitoring system 134 operating while connected to one or more buses 104, 106, 108 of the aircraft 102. This may also include one or more interfaces 210 of the bus monitoring system 134 providing physical and logical interactions needed to communicate over the one or more buses 104, 106, 108.

Bus traffic transmitted over the one or more communication buses is received at the bus monitoring system at step 504. This may include, for example, the one or more interfaces 210 of the bus monitoring system 134 receiving data packets or other bus traffic over one or more of the buses 104, 106, 108 of the aircraft 102. The bus traffic may include command messages, status messages, or other data messages sent by one or more components 110, 112, 114 over the bus(es) 104, 106, 108. The actual contents of the bus traffic can vary based on, among other things, the specific type(s) of bus(es) being monitored and the one or more components 110, 112, 114 coupled to the bus(es).

The bus traffic is analyzed using the bus monitoring system to identify any anomalous behavior detected on the one or more communication buses at step 506. This may include, for example, the intrusion detection system 212 of the bus monitoring system 134 analyzing the data packets or other bus traffic using various policies to determine whether the bus traffic is anomalous. As particular examples, the intrusion detection system 212 may inspect command or data messages for specific types of anomalies, inspect waveforms to detect whether a component is attempting to improperly function as a bus controller or other type of device, inspect multiple bus transactions over time, or emulate a bus controller to send a variety of commands and data transfer requests to other components to characterize those components and their responses. Any of the specific types of policies described above may be used by the intrusion detection system 212 to inspect command, data, or other messages and perform any suitable analyses.

A determination is made whether any anomalous bus behavior has been detected at step 508. If not, the process returns to step 504 to continue receiving and processing additional bus traffic. Otherwise, one or more actions may be taken in response to detected anomalous bus behavior at step 510. This may include, for example, the bus monitoring system 134 generating an alert for a pilot 120 or other personnel onboard or associated with the aircraft 102. The process returns to step 504 to continue receiving and processing additional bus traffic.

Although FIG. 5 illustrates one example of a method 500 for bus monitoring to detect anomalies indicative of malfunctions or cyber-attacks, various changes may be made to FIG. 5. For example, while shown as a series of steps, various steps in FIG. 5 may overlap, occur in parallel, or occur any number of times.

Figure 6:
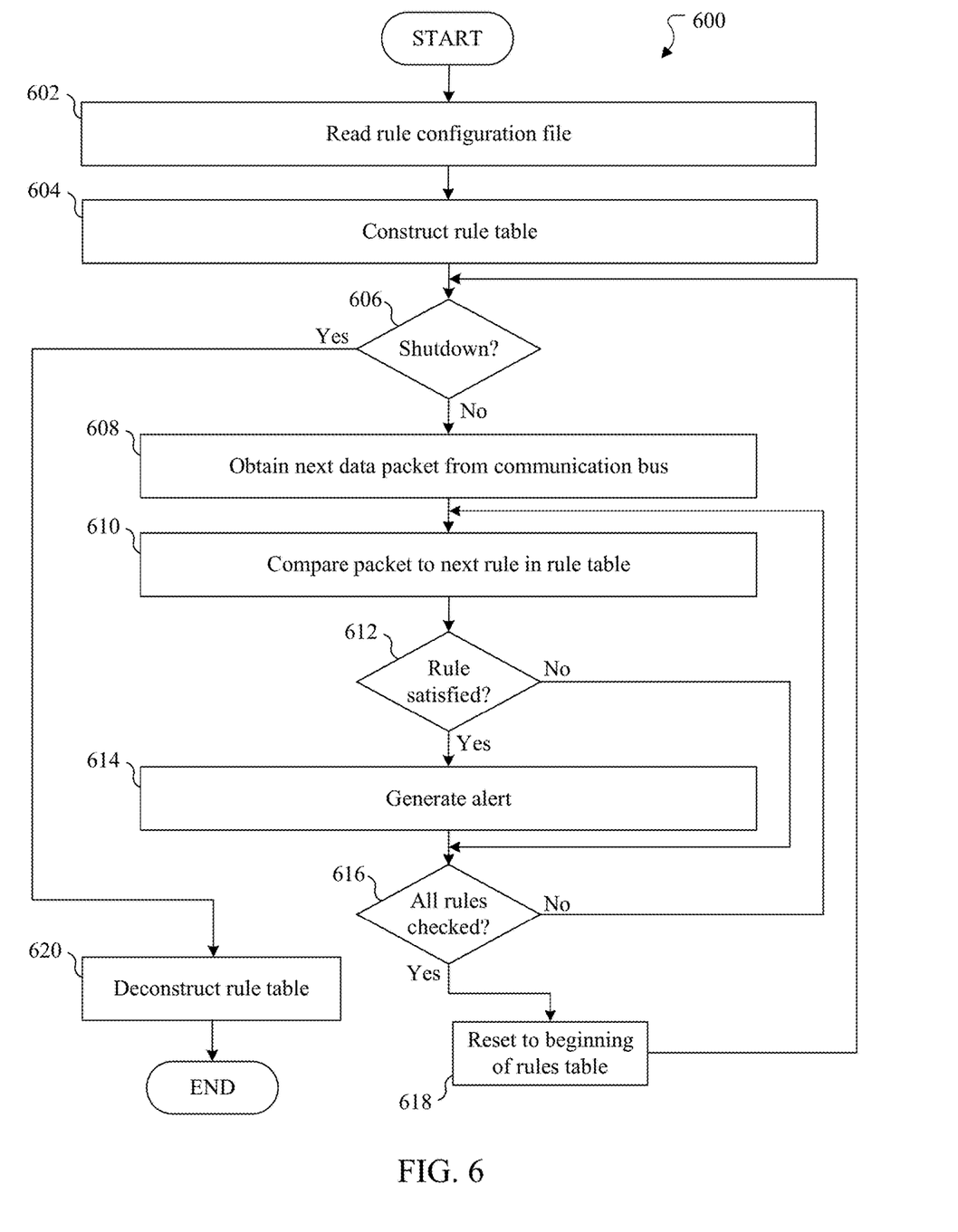
FIG. 6 illustrates an example method for processing data received over a communication bus to detect anomalies indicative of malfunctions or cyber-attacks in accordance with this disclosure.

FIG. 6 illustrates an example method 600 for processing data received over a communication bus to detect anomalies indicative of malfunctions or cyber-attacks in accordance with this disclosure. The method 600 may, for example, occur as part of step 506 in the method 500 of FIG. 5. For ease of explanation, the method 600 shown in FIG. 6 is described as involving the use of the bus monitoring system 134 of FIG. 2 in the aircraft 102 of FIG. 1 to monitor traffic over at least one of the communication buses 104, 106, 108 of FIG. 1. However, the method 600 may involve the use of any other suitable bus monitoring system designed in accordance with this disclosure, which may monitor any suitable communication bus(es) in any suitable environment.

As shown in FIG. 6, at least one rule configuration file is read by a bus monitoring system at step 602. This may include, for example, the processing device 302 that executes the intrusion detection system 212 retrieving various policies from at least one rule configuration file, which can be used to store the policies. Each policy defines one or more rules for determining whether bus traffic is anomalous. As noted above, in some embodiments, the mission management module 206 may control which policies are used by the intrusion detection system 212 and when.

A rule table is constructed by the intrusion detection system at step 604. This may include, for example, the processing device 302 that executes the intrusion detection system 212 generating a table containing the various parameters from the policies that define whether bus traffic is anomalous. Among other things, the rule table may identify whether direct communications between specific bus components are allowed, whether status messages from bus components are allowed to contain specific flags, and whether bus controller command messages are allowed to contain specific mode codes. The rule table may also identify whether bus components should be only transmitting or only receiving data during certain types of bus transaction and if/when message error flags are used properly or improperly. The rule table may further identify permitted bus addresses or message sub-addresses, acceptable message lengths, and related command and status messages that should have matching bus component addresses. In addition, the rule table may identify whether certain types of operations or communications are permitted, an amount of permissible changes in latitude and longitude data, and timing requirements for communications (such as response times to status queries). Of course, any other or additional policies may be defined here, depending among other things on the bus(es) being monitored and the component(s) coupled to the bus(es).

A determination is made whether a system shutdown has been initiated at step 606. If so, the process skips to step 620. Otherwise, a next data packet (or other data traffic) is received from a monitored communication bus at step 608. This may include, for example, the processing device 302 that executes the intrusion detection system 212 obtaining the data packet via one of the interfaces 210. The intrusion detection system compares the data packet to the next rule in the table at step 610. This may include, for example, the processing device 302 that executes the intrusion detection system 212 comparing one or more contents of the data packet or information associated with the data packet to one or more fields of the next rule. This may also include the processing device 302 that executes the intrusion detection system 212 comparing the contents of multiple prior data packets or information associated with the multiple prior data packets to the rule.

A determination is made whether the data packet satisfies the rule at step 612. If so, an alert is generated at step 614. This may include, for example, the processing device 302 that executes the intrusion detection system 212 generating an alert for a pilot 120 or other personnel onboard or associated with the aircraft 102. A determination is made whether all rules in the rule table have been checked at step 616. If not, the process returns to step 610 to compare the data packet or information associated with the data packet to another rule. Otherwise, the system is reset to the rule at the beginning of the rule table at step 618, and the process returns to step 606 to check for a shutdown and process the next data packet received over the monitored bus. Once a shutdown is detected at step 606, the system deconstructs the rule table at step 620, and the method 600 ends.

Although FIG. 6 illustrates one example of a method 600 for processing data received over a communication bus to detect anomalies indicative of malfunctions or cyber-attacks, various changes may be made to FIG. 6. For example, while shown as a series of steps, various steps in FIG. 6 may overlap, occur in parallel, or occur any number of times. As a particular example, multiple rules can be processed simultaneously to determine whether bus traffic is anomalous. Also, the use of a rule table for storing the rules is for illustration only. In addition, in some cases, a threshold number of data packets may need to be detected before a policy is satisfied, and the policy can define the threshold number. In those cases, the number of data packets satisfying the rule may be stored in memory, used to determine if and when the threshold number has been met, and reset as needed.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable storage device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
multiple interfaces configured to be coupled to multiple communication buses, the interfaces configured to receive bus traffic transmitted over the communication buses; and
one or more processing devices configured to implement an intrusion detection system, the intrusion detection system configured to analyze the bus traffic received via one or more of the interfaces to identify anomalous bus traffic;
wherein the one or more processing devices are configured to execute multiple processes to concurrently analyze the bus traffic, the multiple processes configured to perform different analyses of the bus traffic.

2. The apparatus of claim 1, wherein the apparatus is modular and includes:
a physical interface module comprising the multiple interfaces; and
a data processing and analysis module comprising the one or more processing devices.

3. The apparatus of claim 2, wherein the data processing and analysis module supports hardware abstraction to allow different physical interface modules or different interfaces to be used in the apparatus.

4. The apparatus of claim 1, wherein the multiple interfaces are configured to be coupled to at least one of: different types of communication buses and different configurations of communication buses.

5. The apparatus of claim 1, wherein at least one of:
a number of the executing processes used to analyze the bus traffic is configurable; and
different executing processes are configured to be used to analyze the bus traffic in different ways over time.

6. The apparatus of claim 1, wherein the one or more processing devices are configured to analyze the bus traffic in real-time and generate a real-time alert in response to identifying anomalous bus traffic.

7. The apparatus of claim 1, wherein the multiple interfaces are configured to be coupled to multiple avionics communication buses, the multiple avionics communication buses including one or more of: at least one MIL-STD-1553B bus, at least one MIL-STD-1760E bus, at least one ARINC 429 bus, and at least one Controller Area Network bus.

8. A method comprising:
   operating a bus monitoring system comprising multiple interfaces configured to be coupled to multiple communication buses, the interfaces configured to receive bus traffic transmitted over the communication buses; and
   using an intrusion detection system of the bus monitoring system, analyzing the bus traffic received via one or more of the interfaces to identify anomalous bus traffic;
   wherein analyzing the bus traffic comprises using one or more processing devices that execute multiple processes to concurrently analyze the bus traffic, the multiple processes configured to perform different analyses of the bus traffic.

9. The method of claim 8, wherein the bus monitoring system is modular and includes:
   a physical interface module comprising the multiple interfaces; and
   a data processing and analysis module comprising the one or more processing devices.

10. The method of claim 9, wherein the data processing and analysis module supports hardware abstraction to allow different physical interface modules or different interfaces to be used in the method.

11. The method of claim 8, wherein the multiple interfaces are configured to be coupled to at least one of: different types of communication buses and different configurations of communication buses.

12. The method of claim 8, wherein at least one of:
   a number of the executing processes used to analyze the bus traffic is configurable; and
   different executing processes are used to analyze the bus traffic in different ways over time.

13. The method of claim 8, wherein the bus traffic is analyzed in real-time and a real-time alert is generated in response to identifying anomalous bus traffic.

14. The method of claim 8, wherein the multiple interfaces are configured to be coupled to multiple avionics communication buses, the multiple avionics communication buses including one or more of: at least one MIL-STD-1553B bus, at least one MIL-STD-1760E bus, at least one ARINC 429 bus, and at least one Controller Area Network bus.

15. A non-transitory computer readable medium storing instructions that implement an intrusion detection system, the instructions when executed causing at least one processor to:
   receive, via at least one of multiple interfaces configured to be coupled to multiple communication buses, bus traffic transmitted over at least one of the communication buses; and
   analyze the bus traffic received via one or more of the interfaces to identify anomalous bus traffic;
   wherein the instructions that cause the at least one processor to analyze the bus traffic comprise instructions that cause the at least one processor to execute multiple processes to concurrently analyze the bus traffic, the multiple processes configured to perform different analyses of the bus traffic.

16. The non-transitory computer readable medium of claim 15, further containing instructions that when executed cause the at least one processor to support hardware abstraction in order to allow bus traffic to be received from different physical interface modules or different interfaces.

17. The non-transitory computer readable medium of claim 15, wherein the intrusion detection system is configured to receive the bus traffic via the multiple interfaces from at least one of: different types of communication buses and different configurations of communication buses.

18. The non-transitory computer readable medium of claim 15, wherein at least one of:
   a number of the executing processes used to analyze the bus traffic is configurable; and
   different executing processes are configured to be used to analyze the bus traffic in different ways over time.

19. The non-transitory computer readable medium of claim 15, wherein the instructions when executed cause the at least one processor to analyze the bus traffic in real-time and generate a real-time alert in response to identifying anomalous bus traffic.

20. The non-transitory computer readable medium of claim 15, wherein the intrusion detection system is configured to receive the bus traffic via the multiple interfaces from multiple avionics communication buses, the multiple avionics communication buses including one or more of: at least one MIL-STD-1553B bus, at least one MIL-STD-1760E bus, at least one ARINC 429 bus, and at least one Controller Area Network bus.

* * * * *